US010562540B2

(12) United States Patent
Van Wiemeersch et al.

(10) Patent No.: US 10,562,540 B2
(45) Date of Patent: Feb. 18, 2020

(54) METHOD AND APPARATUS FOR VEHICLE VALET CONTROL DEVICES

(71) Applicant: FORD GLOBAL TECHNOLOGIES, LLC, Dearborn, MI (US)

(72) Inventors: John Robert Van Wiemeersch, Novi, MI (US); Aaron DeLong, Toledo, OH (US); Vivekanandh Elangovan, Canton, MI (US); Timothy Thivierge, Jr., Carleton, MI (US); Brian Wilkerson, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/244,662

(22) Filed: Jan. 10, 2019

(65) Prior Publication Data

US 2019/0168775 A1 Jun. 6, 2019

Related U.S. Application Data

(62) Division of application No. 15/832,328, filed on Dec. 5, 2017, now Pat. No. 10,370,005.

(51) Int. Cl.
| | |
|---|---|
| *B60W 50/12* | (2012.01) |
| *B60W 30/182* | (2020.01) |
| *B60R 25/33* | (2013.01) |
| *B60R 25/102* | (2013.01) |
| *G08G 1/00* | (2006.01) |
| *B60R 25/20* | (2013.01) |
| *H04W 4/40* | (2018.01) |

(52) U.S. Cl.
CPC ............ *B60W 50/12* (2013.01); *B60R 25/102* (2013.01); *B60R 25/20* (2013.01); *B60R 25/33* (2013.01); *B60W 30/182* (2013.01); *G08G 1/207* (2013.01); *H04W 4/40* (2018.02); *B60W 2520/10* (2013.01)

(58) Field of Classification Search
CPC ...... B60W 50/12; B60R 25/102; B60R 25/33; G08G 1/207; H04W 4/046
USPC .................................................... 340/426.16
See application file for complete search history.

(56) References Cited

U.S. PATENT DOCUMENTS

| | | | |
|---|---|---|---|
| 6,386,007 B1 * | 5/2002 | Johnson | G01S 3/38 70/257 |
| 8,050,815 B2 | 11/2011 | Perry et al. | |
| 9,194,168 B1 * | 11/2015 | Lu | E05F 15/70 |
| 9,288,637 B2 * | 3/2016 | Moeller | H04W 4/021 |
| 9,288,638 B2 | 3/2016 | Moeller | |
| 9,845,050 B1 * | 12/2017 | Garza | G08B 21/0205 |
| 2009/0115639 A1 * | 5/2009 | Proefke | G07C 9/00309 340/989 |
| 2009/0146846 A1 * | 6/2009 | Grossman | B60R 25/04 340/988 |
| 2010/0052931 A1 * | 3/2010 | Kolpasky | B60R 25/00 340/670 |

(Continued)

*Primary Examiner* — Omar Casillashernandez
(74) *Attorney, Agent, or Firm* — Michael Spenner; Brooks Kushman P.C.

(57) ABSTRACT

A system includes a processor configured to place a vehicle into a valet mode, restricting vehicle usage. The processor is also configured to determine that a valet tag, having a wireless connection to the vehicle, is in motion, while the vehicle is in valet mode and activate an external indicator usable to find the vehicle, responsive to the tag motion.

18 Claims, 6 Drawing Sheets

(56) References Cited

U.S. PATENT DOCUMENTS

| | | | |
|---|---|---|---|
| 2013/0033361 A1* | 2/2013 | Lickfelt | B60R 25/00 340/5.72 |
| 2014/0309870 A1* | 10/2014 | Ricci | B60W 50/14 701/36 |
| 2015/0116079 A1* | 4/2015 | Mishra | G07C 9/00007 340/5.52 |
| 2016/0082880 A1* | 3/2016 | Co | B60Q 1/2611 701/2 |
| 2017/0032593 A1* | 2/2017 | Patel | G07C 9/00309 |
| 2018/0065541 A1* | 3/2018 | Augusty | B60Q 1/26 |
| 2018/0326947 A1* | 11/2018 | Oesterling | B60R 25/241 |
| 2019/0164425 A1* | 5/2019 | Yanagida | G08G 1/123 |
| 2019/0168775 A1* | 6/2019 | Van Wiemeersch | H04W 4/40 |

\* cited by examiner

METHOD AND APPARATUS FOR VEHICLE VALET CONTROL DEVICES

CROSS-REFERENCE TO RELATED APPLICATIONS

This application is a division of U.S. application Ser. No. 15/832,328 filed Dec. 5, 2017, now U.S. Pat. No. 10,370,005, the disclosure of which is hereby incorporated in its entirety by reference herein.

TECHNICAL FIELD

The illustrative embodiments generally relate to methods and apparatuses for vehicle valet control devices.

BACKGROUND

Many hotels, restaurants and venues offer valet options for people seeking to park a vehicle. Using a valet service commonly involves turning a key over to a valet and allowing the valet to drive away in a vehicle. This often gives the valet access to contents in the vehicle, any driver personal data stored on a vehicle computer, as well as the ability to drive the vehicle virtually anywhere.

In consideration of the perceived risks of valet services, vehicle manufacturers have undertaken efforts to limit valet vehicle-accessibility. By putting a vehicle in "valet mode", the driver can limit the access to vehicle interfaces and in some cases, the drivable vehicle range and/or speed. The driver still typically turns over the keys, however, and if the driver forgets to disable the valet mode upon returning to the vehicle, the driver may experience a limited period of restricted vehicle usage and/or restricted vehicle compartment and system access (e.g., lockout of interactive screens and/or locking of vehicle compartments).

Also, in the common model, if vehicle keys are lost or stolen, the driver may find themselves without access to a vehicle or a way to drive the vehicle home. The cost of replacing many modern electronic keys can be expensive. Even if paid by the valet service, the time and hassle involved can be very irritating to the vehicle owner.

SUMMARY

In a first illustrative embodiment, a system includes a processor configured to place a vehicle into a valet mode, restricting, vehicle usage. The processor is also configured to determine that a valet tag, having a wireless connection to the vehicle, is in motion, while the vehicle is in valet mode and activate an external indicator usable to find the vehicle, responsive to the tag motion.

In a second illustrative embodiment, a system includes a processor configured to periodically seek a wireless signal from a valet tag associated with a vehicle including the processor. The processor is also configured to issue an alert to a predefined source, responsive to failing to find the wireless signal.

In a third illustrative embodiment, a computer-implemented method includes determining that a valet tag is in motion after having ceased motion for a predetermined period of time. The method also includes determining that a vehicle is in a valet mode, restricting vehicle functionality and providing a visual or audible indicator, usable to find the vehicle from a location exterior to the vehicle, responsive to determining that the tag is in motion and that the vehicle is in valet mode.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
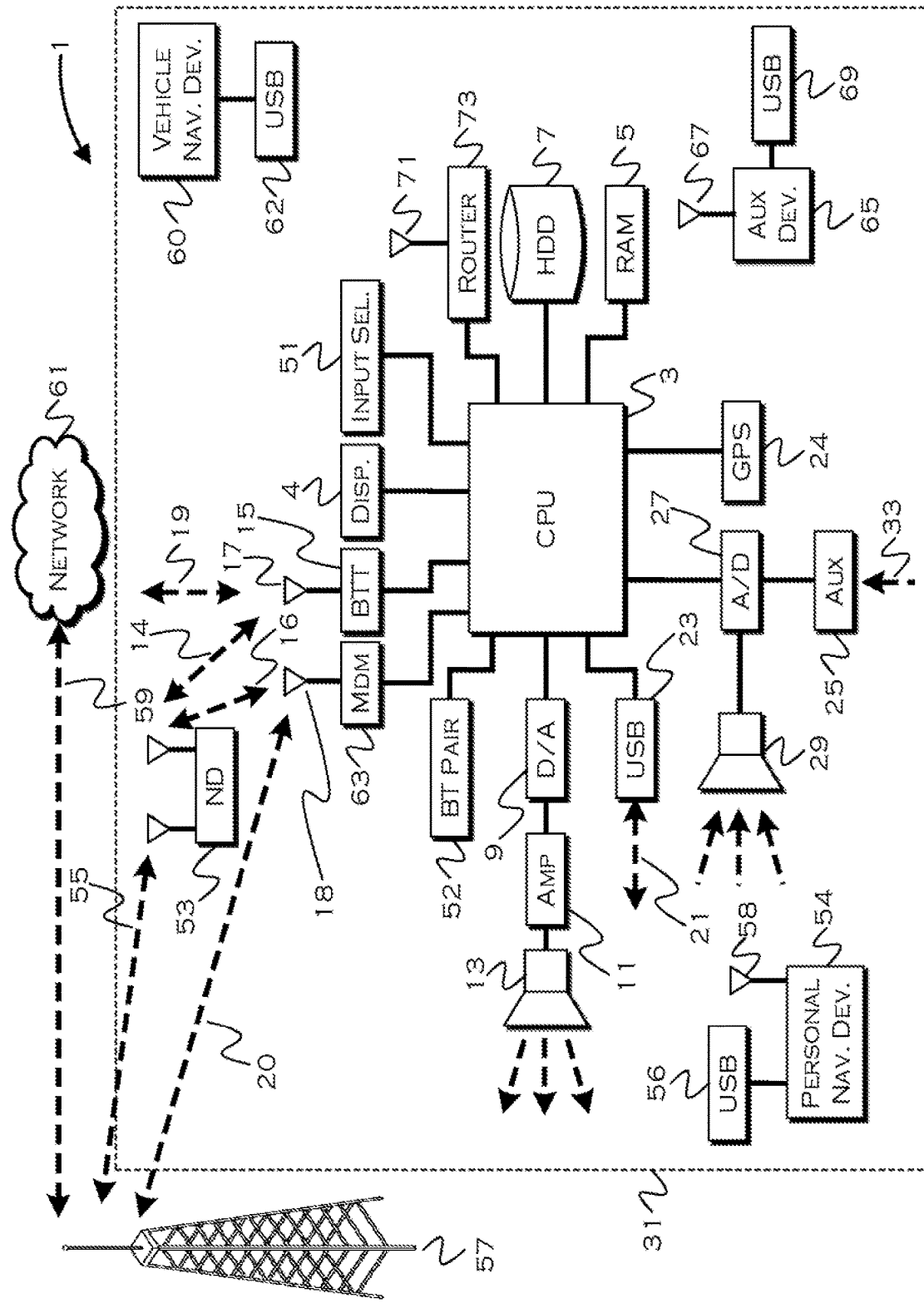
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual driver zone interface 4 located in the vehicle. The user may also be able to interact with the interface if it is provided, tear example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as Personal Navigation Device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). BLUETOOTH is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the interact, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer), in another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple). i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system. (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose use of a valet control tag, such as a small BLUETOOTH LOW ENERGY (BLE) device that provides sufficient functionality for the valet to find, access and drive a vehicle, but which does not require the driver to turn over a full set of keys and/or provide full vehicle functionality.

Figure 2:
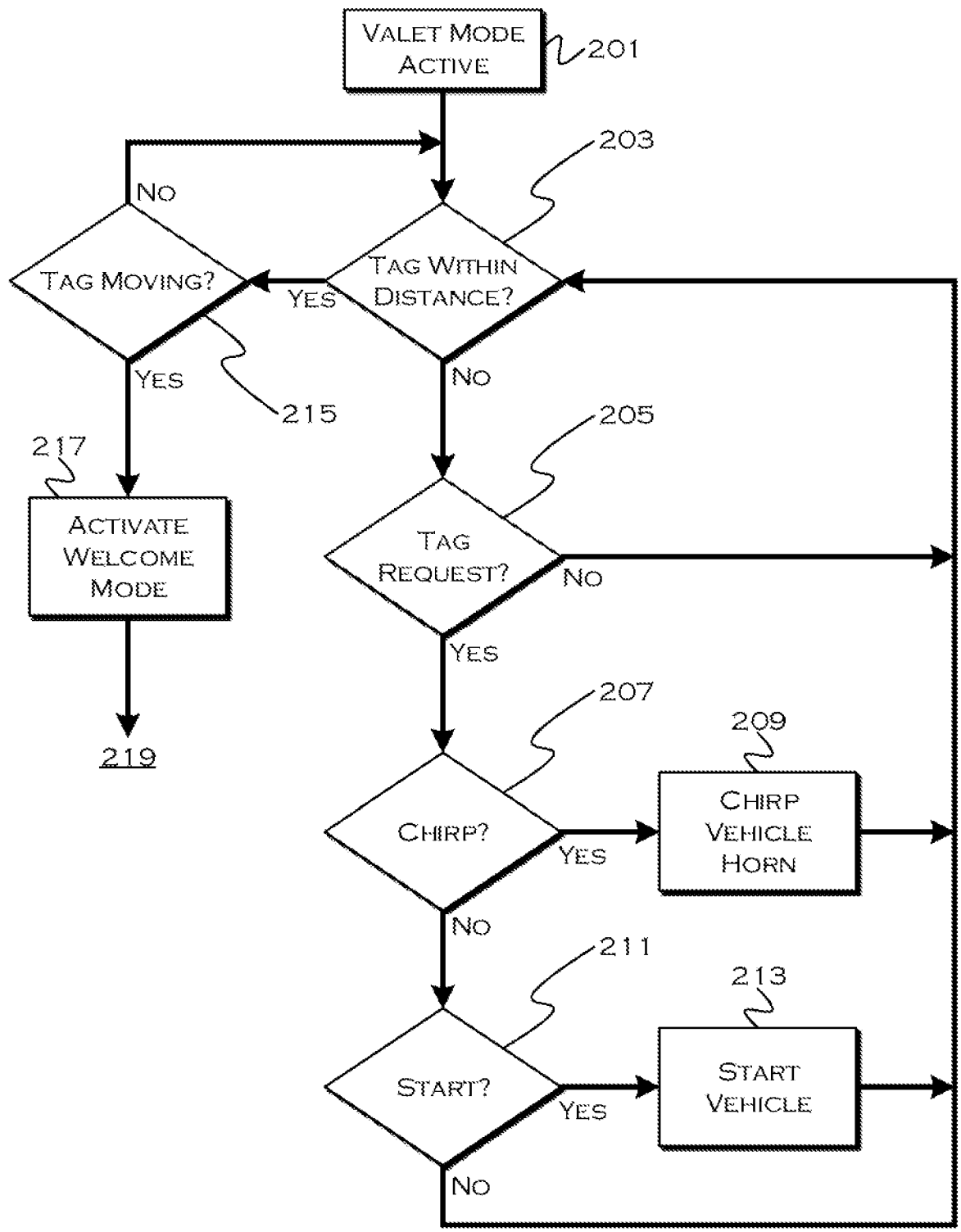
FIG. 2 shows an illustrative process for tag request handling.
Figure 2:
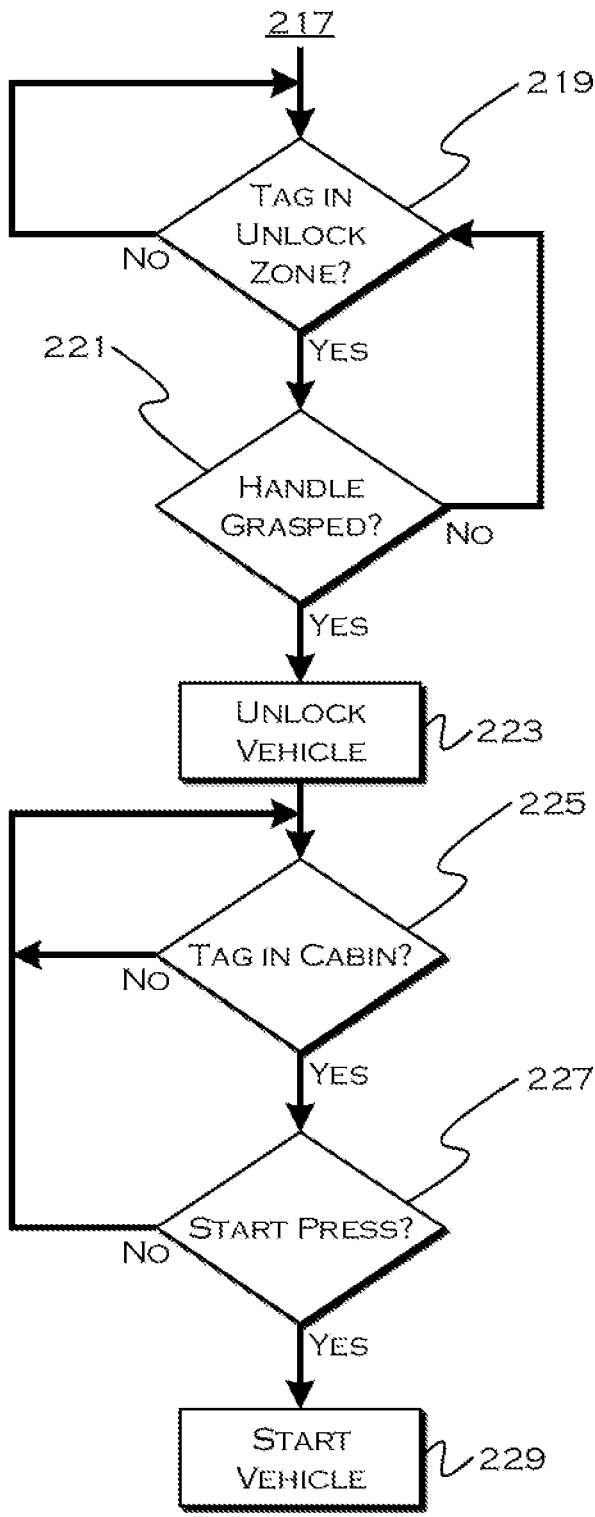

In the illustrative examples, a driver is provided with a small-footprint BLE device that is similar to a key fob, or even smaller. This device may affix to the vehicle in some manner, or may be carried by the driver along with keys, and be easily detachable for transfer to a valet. The device can also rest disabled unless the driver places the vehicle into valet mode, at which point the functionality of the BLE valet tag can be enabled if the tag motion detection feature is enabled and the tag is in motion. If the tag has motion-detection enabled, once the tag moves the vehicle will recognize the tag if the driver has placed the vehicle in valet mode. In some examples, the vehicle may always be able to communicate with the tag, in motion or not, but elect to take no action unless the tag is in motion and the vehicle is in valet mode. Such continuous motioning of the ability to keep track of the tag and advise the driver if the tag is not present on each key-on or key-off event. This functionality can be used to mitigate theft of the tag (ex., car wash, service event) and help ensure the tag is returned by the valet should the vehicle recognize a different valid key held by the driver or other passengers of the vehicle when the valet presents them the vehicle therefore resulting in no "key not found" alert since multiple keys would be present, FIG. 2 shows an illustrative process for tag request handling. In this example, the driver enables a valet mode through a mobile device or through a vehicle interface. The mode enablement can be password protected, and the driver can selectively enable and disable the mode. If multiple possible valet-controls exist in conjunction with the valet tag, the driver could also selectively enable or disable those controls at this point, to allow or prevent certain aspects of the valet mode from being used. In other examples, valet mode could be engaged whenever an active valet tag was detected in a cabin, or if a valet tag was removed from a persistent mount or otherwise moved in a manner not in accordance with a moving vehicle to which the tag may be typically affixed. Valet mode could be disengaged whenever an active key fob was detected in a cabin and a button is pressed in the display.

Once valet mode is active, in this example, the process is able to enact a welcome mode to identify the vehicle for a valet. This can include, for example, illuminating vehicle lights and otherwise visually and/or audibly identifying a vehicle so the vehicle is discernible from a distance. This mode may also be used in conjunction with the owner's key fob, but in this example, the valet mode causes the welcome mode to be active for a user at a distance further than a typical owner welcome mode would activate. This can assist a valet in finding the vehicle in a crowded parking lot.

Since the vehicle may be parked within a detectable range of the valet stand (and thus the valet tag), the process determines both whether 203 the valet tag is within a predefined distance associated with the valet welcome mode and whether 215 the tag is in motion. The motion of the tag can be detected by a change in tag signal strength or based on motion sensors included with the tag, the output of which can be sent to the vehicle by the tag.

If the tag is moving and within the range for a valet welcome mode, the process can activate 217 the welcome mode, causing the vehicle to be visually and/or audibly identifiable to the valet. The welcome mode may persist for a fixed period, until the tag moves out of range, until the tag stops moving for more than a predetermined amount of time or until the tag enters a range for passive unlock, far example.

Once the valet tag enters 219 a predefined unlock zone range, the process enables passive unlock, which allows the valet to unlock the vehicle by grasping the handle of the vehicle. This function is similar to passive unlock on the basis of a vehicle fob being present. Once the valet engages 221 the vehicle door handle, the process can unlock the vehicle on the basis of the engagement and presence of the valet tag. The process then determines 225 whether the valet tag has entered the vehicle cabin.

Again, the start functionality activates on the basis of the tag being in the cabin in a manner similar to that of passive start based on fob presence. If the valet presses 227 a start button on the vehicle, the process engages 229 the vehicle engine. If there is limited functionality associated with a valet-tag authenticated start, the vehicle can also impose that functionality at this time.

Tags can also broadcast or advertise the VIN to which they correspond either periodically and/or in response to a particular gesture with movement of the tag. This can allow both the object vehicle (from which the tag came) and other vehicles using the tag system to read the VIN and know the location of the tag and participate in facilitating identification of the vehicle to which the tag belongs should a tag be unintentionally left at the valet service. Further, an application on a phone, for example, or a valet device, could also receive the advertisement and provide a description of the vehicle to which the tag corresponds. If used in conjunction with a database, this signal from the tag could also provide information about the vehicle beyond what is knowable from the VIN.

If the tag is outside a welcome zone, certain movements with the tag or other interactions with the tag could still cause the vehicle to respond. If a request is made 205 with the tag (via movement or otherwise), the vehicle may attempt to determine a request and corresponding action, if the movement/action corresponds to a chirp 207 request, the process may cause 209 the vehicle horn to chirp. If the movement corresponds to a start 211 request, the process may remote start the vehicle (assuming such features are enabled via the tag). The tag can be capable of transmitting detected movement parameters and/or self-determining a command associated with a movement parameter and simply transmitting the command.

Figure 3:
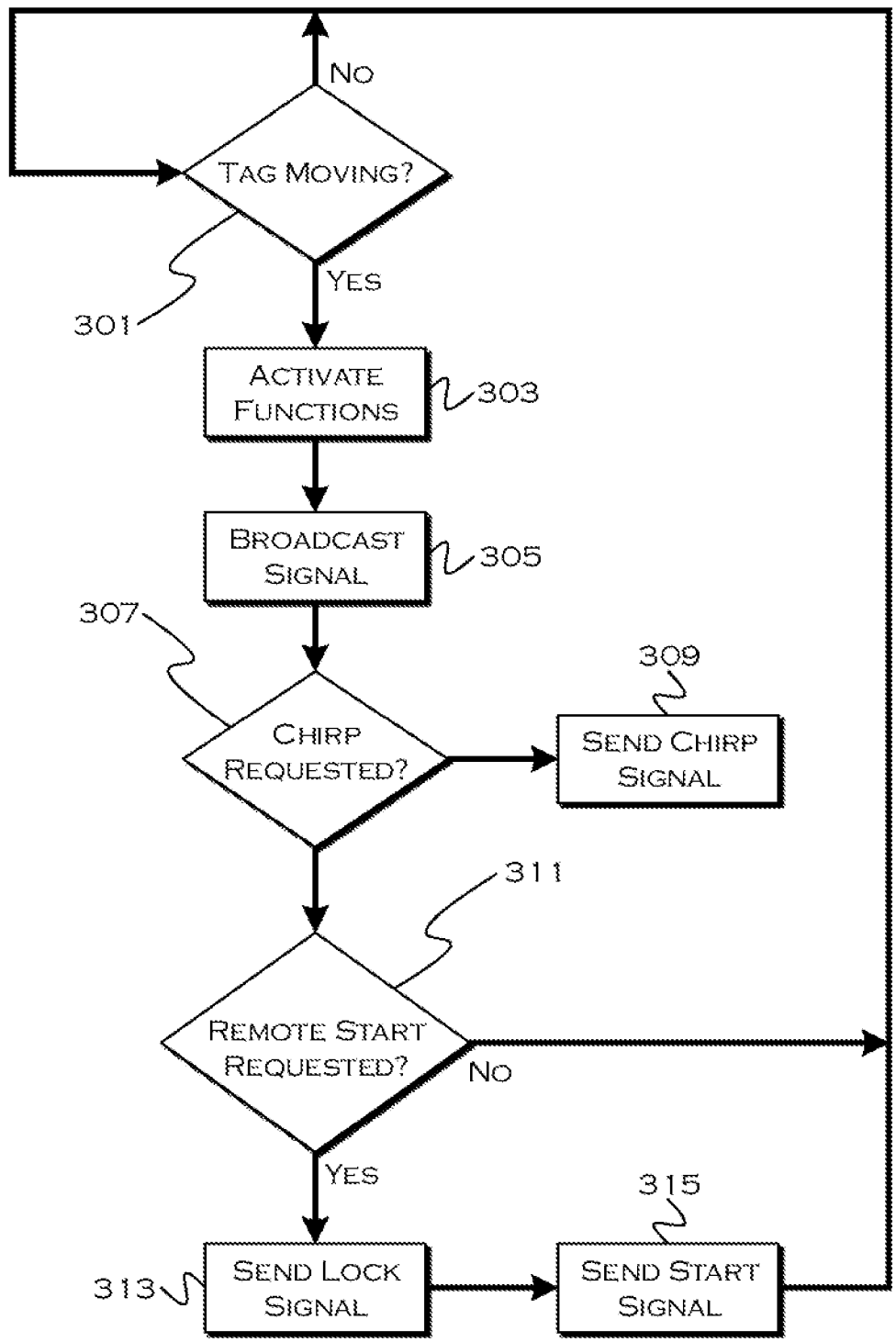
FIG. 3 shows an illustrative tag control process.

FIG. 3 shows an illustrative tag control process. In many valet instances, the vehicles are parked in structures or lots that are not immediately proximate to a valet stand. This can require the valet to travel to a vehicle lot location and find a vehicle in a large pool of vehicles. Since the valet has parked potentially dozens of vehicles or more since parking a user vehicle, it can be difficult for the valet to remember where a particular vehicle was parked. While the welcome mode can assist in vehicle location, the range is not limitless, and there are other reasons not to engage a welcome mode until the user is closer to the vehicle. Accordingly, in this example, the valet tag may be provided with additional location-assistance functionality, including, for example, sound-locating and/or remote start.

In this example, the tag may be a buttonless tag, but motion sensors onboard the tag allow the tag to act as though it had buttons, responsive to various gesture-based controls. For example, pounding the tag into the palm of a hand could activate a chirp function, and moving the tag in multiple circular motions could activate a remote start function. The specific gestures are illustrative in nature, provided to demonstrate how multiple functions can be gesture controlled via a buttonless tag.

In this example, the process enables 303 function detection once the tag is in motion 301. As the valet moves around, seeking the vehicle, the tag can broadcast a signal detectable by the vehicle. If the valet makes a gesture 307 that corresponds to a chirp request, the process can send 309 a signal to the vehicle instructing audible output, such as an alarm or horn chirp. In some examples, tag may send multiple chirp commands in a row with each gesture (e.g., continue at a slow rate such as once per second) until the valet has grabbed the door handle.

Alternatively, if the valet makes a motion corresponding to a remote start command 311, the process can send 313 a lock signal to the vehicle and then send 315 a remote start signal. The lock signal is not necessary, but may help ensure that the vehicle is locked before the vehicle is remote started, even if drive-away may not be possible in the absence of the close-proximity of a valet tag or fob. Thus, the valet can use various gestures to quickly locate a vehicle and/or start a vehicle while looking for the vehicle.

Valet mode may also be disabled (until the next use) and/or enabled through a gesture with the tag. In such an example, the owner would presumably disable and enable the tag, and using the tag to disable valet mode would help prevent the tag from being left behind. Additionally or alternatively, at each key-on cycle, or other periodic interval, the vehicle could seek the presence of the tag, to ensure it had not been removed or left behind. It is even possible for the vehicle to store the last location where a tag responded, so that any point where the tag does not respond, the vehicle can inform an owner about where the tag was last detected (location-wise).

Figure 4A:
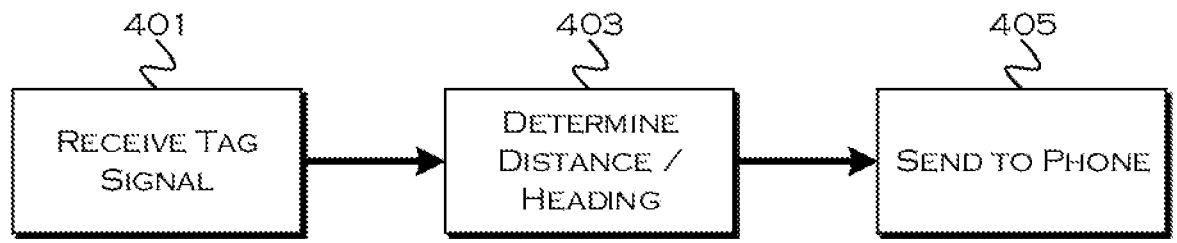
FIG. 4A shows an illustrative tag tracking process.

FIG. 4A shows an illustrative tag tracking process. In this example, the process, in conjunction with a user mobile device, for example, is capable of tracking the progress of a valet through tracking the valet tag motion. This may require a signal from the tag that includes both a measurable strength and directionality, or directionality may be determined through triangulation of the tag signal.

In this example, the vehicle receives 401 a signal from the tag, which may also be transmitted when the tag is in motion, but not when the tag is at rest. This can avoid wearing down the tag or vehicle battery if the tag is in detectable range of the vehicle while at a valet stand. The vehicle uses the tag signal to determine 403 the distance to the tag (through a process such as received signal strength indicator (RSSI) measurement or other suitable method) and the heading to the tag, which allows the vehicle to determine a position of the tag relative to a known vehicle location. The vehicle then sends 405 the location of the tag (and possibly the location of the vehicle) to a driver mobile device or other device. The vehicle could also send the tag data to determine the relative position of the tag to the mobile device, and the mobile device could perform the calculation of tag location, if desired.

One useful aspect of this concept is that because the tag may be small and portable, the driver could place the tag in a purse, on a pet or child, or on another object for tracking, and the vehicle could track the object's location based on tracking the tag. This could let a driver know if a purse, child or pet had left the vehicle, and an alert could be sit based on the tag leaving a certain proximity of the vehicle if this sort of tracking were desired. The alert could be issued by the vehicle as an audible or visual alert, and/or be sent by the vehicle to a driver phone.

Figure 4B:
FIG. 4B shows an illustrative tag tracking display process.

FIG. 4B shows an illustrative tag tracking display process. In this example, the driver device receives 411 the information from the vehicle indicating the vehicle position. The device also receives information indicating the position of the tag or the position of the tag relative to the vehicle location. The device can then use this information in conjunction with a digital map to display the motion and progress of the valet tag as the valet moves towards the vehicle.

Figure 5:
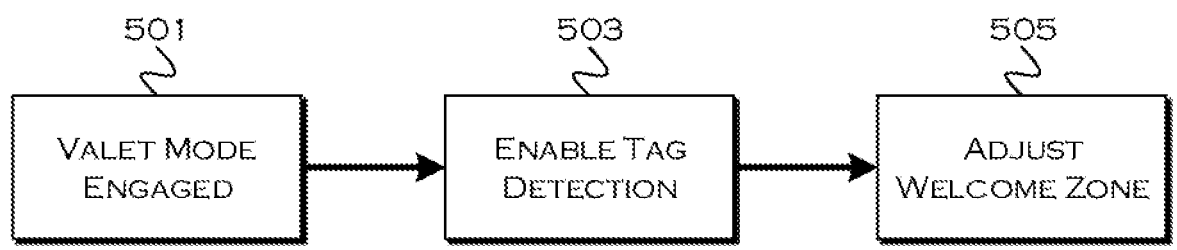
FIG. 5 shows an illustrative valet mode adjustment process.

FIG. 5 shows an illustrative valet mode adjustment process. In this example, the vehicle is provided with a driver welcome mode, which may activate when a driver moves within a certain proximity to the vehicle (e.g., 3 feet). This mode may include illuminating the area outside one or more doors, enabling vehicle interior lights, flashing or enabling vehicle exterior lights, etc.

In this example, once the driver engages 501 a valet mode, the vehicle makes several changes to functionality. The vehicle enables 503 communication with a detected valet tag, which essentially works to enable the tag for usage. The vehicle may also adjust the proximity associated with the welcome mode to a larger perimeter (e.g. 30 feet), which can assist the valet in finding the vehicle in a dark parking lot.

Figure 6:
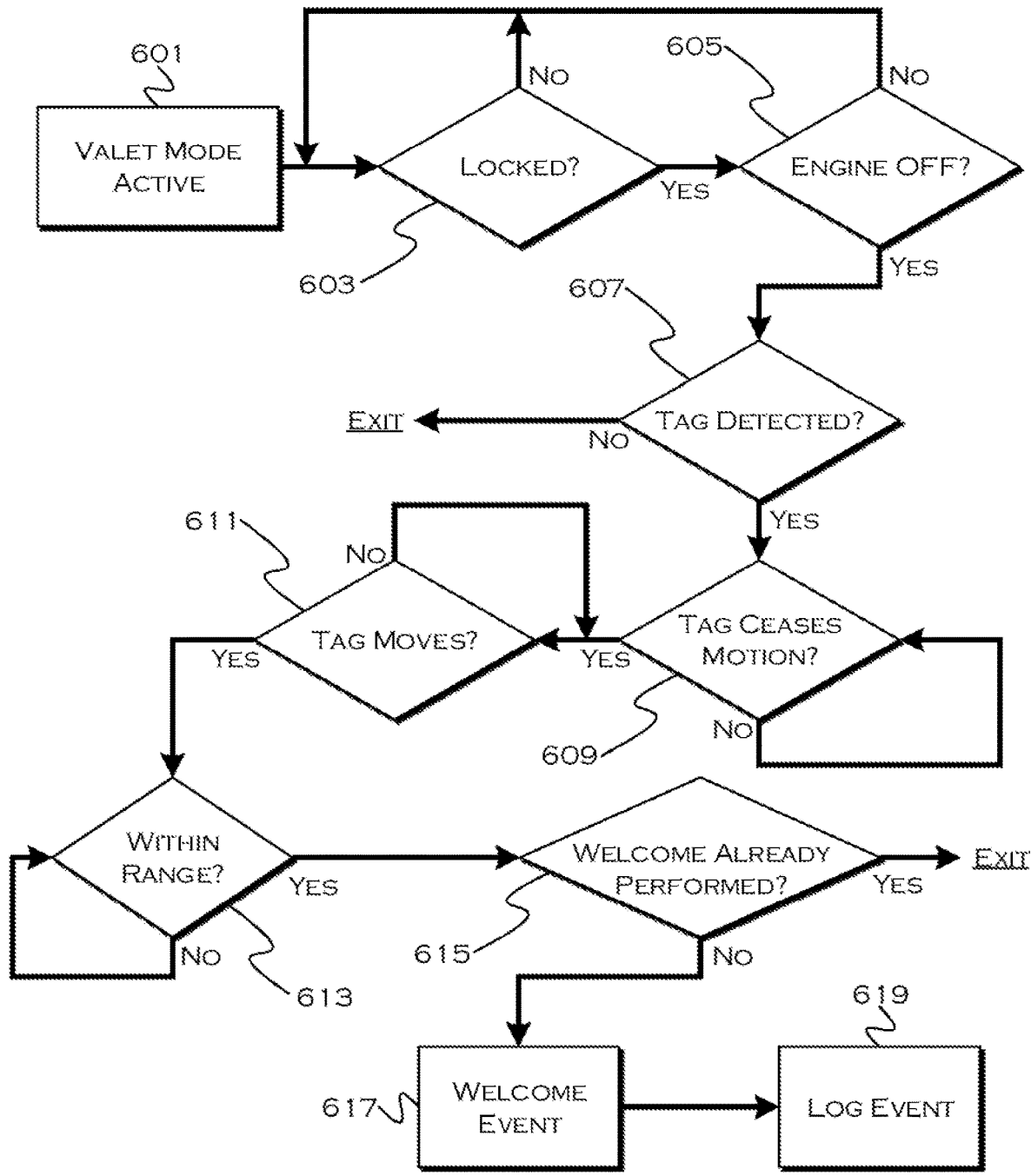
FIG. 6 shows an illustrative vehicle-location process.

FIG. 6 shows an illustrative vehicle-location process. In this example, the process determines 601 that a valet mode has been activated for a vehicle. Since the tag will presumably be in detectable communication range at this point, as the driver is likely carrying the tag or the tag is elsewhere in the vehicle, it may not be desirable to activate features such as "welcome mode" based on the presence of the tag, until certain measures have determined that the tag is actually in the possession of the valet and the valet is actually seeking, not parking, the vehicle. This cycle can occur following an ignition event or other suitable designator of a key cycle.

In this example, the process waits until the process determines that the vehicle is both locked 603 and the engine is disengaged 605. This is one example of an initial determination that a vehicle has actually been parked, and is not simply sitting at a building entrance waiting for a valet to park the vehicle. Since users may stop, lock and exit their vehicle if a long valet line is present, the process occurring each ignition cycle still allows the process to occur after the valet restarts, drives, parks and locks the vehicle.

If the vehicle detects the tag 607, the vehicle also determines if the tag has ceased motion 609, possibly for more than a predetermined period of time. This tends to indicate that the tag is present and that the tag has been resting in a valet stand, as opposed to an owner pocket while waiting for a valet. If the tag is out of detectable range, the cease-motion detection may be stored internally on the tag and indicated to the vehicle once the tag is in detectable range. That is, the tag self-determines that it has ceased motion for a period of time, and informs the vehicle of this fact once the vehicle detects the tag, since the tag will presumably be moving with the valet, and not at rest, at this point in time.

After the tag has been resting for more than the predetermined period of time (which could be as short as desired), the process determines 611 if the tag is currently in motion. This determination helps address the situation where the vehicle is parked within range of the tag, so that false welcome modes are not activated based on vehicle-proximity to a valet stand.

If the tag is moving, following the tag having been stationary, the process determines 613 if the tag is within a predefined welcome mode range. This can be less than the detectable range of the tag signal, and if the tag is within range, the vehicle then determines 615 if a welcome mode has already been performed for this current key cycle. This last determination prevents the vehicle from activating welcome modes if the valet is constantly traveling to the vehicle lot with the driver key in the valet's pocket. While this may result in the welcome mode not being performed when the valet is actually looking for the vehicle, other fob functionality such as the gesture controls can still allow the valet to find the vehicle, and this can prevent overtaxing a vehicle battery by constant welcome mode activation every time the valet passes within welcome mode range of the vehicle while carrying the tag.

If the welcome mode has not been performed for this key cycle, the process engages 617 a welcome mode event and logs 619 the occurrence of the event. It is also worth noting that the welcome mode could be engaged once per time cycle, as opposed to key cycle, as an suitable and illustrative example of how there are alternative ways to control welcome mode activation if desired.

The illustrative embodiments provide examples of how a small form valet tag can be provided and enabled for vehicle valet events, allowing the owner to retain key fob possession while allowing the valet to easily locate, access and drive a vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
periodically seek a wireless signal from a valet tag associated with a vehicle including the processor;
wherein the processor is configured to store vehicle GPS coordinates each time the signal from the tag is detected during the periodic seeking; and
issue an alert to a predefined source, responsive to failing to find the wireless signal.

2. The system of claim 1, wherein the alert includes the GPS coordinates saved the most recent time the signal from the tag was detected.

3. The system of claim 1, wherein the processor is configured to determine a distance of the tag from a vehicle based on the wireless signal, when the tag is detected.

4. The system of claim 1, wherein the processor is configured to determine a heading of the tag from a vehicle based on the wireless signal, when the tag is detected.

5. The system of claim 1, wherein the processor is configured to approximate the location of the tag, relative to the vehicle, based on at least distance and heading of the tag, determined from the wireless signal.

6. The system of claim 1, wherein the processor is configured to issue an alert responsive to the tag exceeding a certain distance, determined based on the wireless signal, from the vehicle.

7. The system of claim 6, wherein the alert includes a distance of the tag from the vehicle, determined based on the wireless signal.

8. The system of claim 6, wherein the alert includes a heading of the tag relative to the vehicle, determined based on the wireless signal.

9. A method comprising:
periodically seeking a wireless signal, using a vehicle transceiver, from a valet tag associated with a vehicle including the transceiver;
storing vehicle GPS coordinates at the vehicle, each time the signal from the tag is detected during the periodic seeking;
and issuing an alert from the vehicle to a predefined source, stored at the vehicle, responsive to failing to find the wireless signal.

10. The method of claim 9, wherein the alert includes the GPS coordinates saved the most recent time the signal from the tag, was detected.

11. The method of claim 9, further comprising determining a distance of the tag from a vehicle based on the wireless signal, when the tag is detected.

12. The method of claim 9, further comprising determining a heading of the tag from a vehicle based on the wireless signal, when the tag is detected.

13. The method of claim 9, further comprising approximating the location of the tag, relative to the vehicle, based on at least distance and heading of the tag, determined from the wireless signal.

14. The method of claim 9, further comprising issuing an alert responsive to the tag exceeding a certain distance, determined based on the wireless signal, from the vehicle.

15. The method of claim 14, wherein the alert includes a distance of the tag from the vehicle, determined based on the wireless signal.

16. The method of claim 14, wherein the alert includes a heading of the tag relative to the vehicle, determined based on the wireless signal.

17. A non-transitory computer-readable storage medium, storing instructions that, when executed by a processor, cause the processor to perform a method comprising:
periodically seeking a wireless signal, using a vehicle transceiver, from a valet tag associated with a vehicle including the transceiver;
storing vehicle GPS coordinates at the vehicle, each time the signal from the tag is detected during the periodic seeking;
and issuing an alert from the vehicle to a predefined source, stored at the vehicle, responsive to failing to find the wireless signal.

18. The storage medium of claim 17, the method further comprising approximating the location of the tag, relative to the vehicle, based on at least distance and heading of the tag, determined from the wireless signal, and wherein the alert includes the determined distance or heading of the tag, or both.

\* \* \* \* \*